(12) United States Patent
Zimmermann et al.

(10) Patent No.: US 12,109,870 B2
(45) Date of Patent: Oct. 8, 2024

(54) REFRIGERATION CIRCUIT WITH PRESSURE EQUALIZATION BETWEEN MULTIPLE CONDENSERS

(71) Applicant: Ipetronik Gmbh & Co. KG, Baden-Baden (DE)

(72) Inventors: Adrian Zimmermann, Rastatt (DE); Walter Zipp, Baden-Baden (DE); Jörg Kirchhof, Karsruhe (DE); Andreas Inhoff, Steinmauem (DE)

(73) Assignee: IPETRONIK GMBH & CO. KG (DE)

( * ) Notice: Subject to any disclaimer, the term of this patent is extended or adjusted under 35 U.S.C. 154(b) by 539 days.

(21) Appl. No.: 17/286,061

(22) PCT Filed: Sep. 3, 2019

(86) PCT No.: PCT/EP2019/073431
§ 371 (c)(1),
(2) Date: Apr. 16, 2021

(87) PCT Pub. No.: WO2020/078609
PCT Pub. Date: Apr. 23, 2020

(65) Prior Publication Data
US 2022/0363109 A1 Nov. 17, 2022

(30) Foreign Application Priority Data
Oct. 19, 2018 (DE) .................. 10 2018 125 984.0

(51) Int. Cl.
*B60H 1/32* (2006.01)
*B60H 1/00* (2006.01)
(Continued)

(52) U.S. Cl.
CPC ......... *B60H 1/323* (2013.01); *B60H 1/00485* (2013.01); *B60H 1/2218* (2013.01);
(Continued)

(58) Field of Classification Search
CPC ............ B60H 1/00485; B60H 1/2218; B60H 1/3211; B60H 1/323; B60H 2001/3251; F25B 6/00; F25B 6/02; F25B 6/04
See application file for complete search history.

(56) References Cited

U.S. PATENT DOCUMENTS 9,242,527 B2  1/2016  Graaf
9,827,830 B2  11/2017  Sondermann
(Continued)

FOREIGN PATENT DOCUMENTS

CN   102563943 A   7/2012
CN   104812601 A   7/2015
(Continued)

OTHER PUBLICATIONS

International Search Report (ISR) issued in International Application PCT/EP2019/073431, mailed Nov. 14, 2019, 3 pages. The English translation of the ISR also acts as a concise statement of relevance for JP7164868.
(Continued)

*Primary Examiner* — Jonathan Bradford
(74) *Attorney, Agent, or Firm* — Sterne, Kessler, Goldstein & Fox P.L.L.C.

(57) ABSTRACT

A refrigerant circuit, which can be used in a vehicle or motor vehicle, includes an air conditioning compressor, a main condenser, at least one connectable condenser, and a switching valve. The switching valve can connect one or more of the switchable condensers to the refrigerant circuit. The circuit may also include a pressure equalizing device with an electric heater that can equalize an internal pressure of the at least one connectable condenser with an internal pressure of the main condenser.

26 Claims, 8 Drawing Sheets

Figure 1:
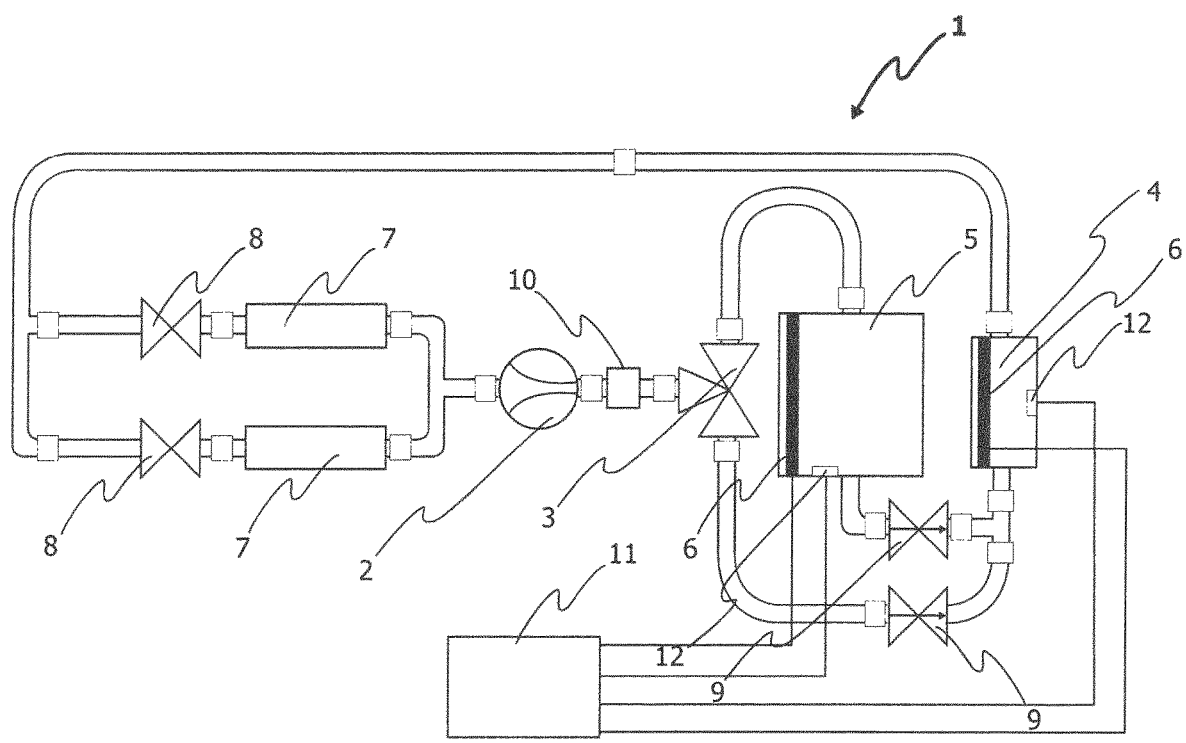

(51) Int. Cl.
*B60H 1/22* (2006.01)
*F25B 6/02* (2006.01)
*F25B 6/04* (2006.01)
*F25B 49/02* (2006.01)
*F25B 5/02* (2006.01)

(52) U.S. Cl.
CPC .............. *B60H 1/3211* (2013.01); *F25B 6/02* (2013.01); *F25B 6/04* (2013.01); *F25B 49/027* (2013.01); *B60H 2001/3251* (2013.01); *F25B 5/02* (2013.01); *F25B 2500/12* (2013.01); *F25B 2600/17* (2013.01); *F25B 2700/195* (2013.01)

(56) References Cited

U.S. PATENT DOCUMENTS 10,611,213 B2   4/2020   Suzuki
2004/0011068 A1   1/2004   Hatakeyama
2013/0055751 A1*   3/2013   Inaba .................... F25B 6/04
  62/498
2017/0210202 A1   7/2017   Suzuki et al.

FOREIGN PATENT DOCUMENTS

| | | |
|---|---|---|
| CN | 106414126 A | 2/2017 |
| JP | 7164868 A | 6/1995 |
| WO | 2014/086442 A1 | 6/2014 |

OTHER PUBLICATIONS

English translation of Written Opinion of the International Searching Authority for International Application No. PCT/EP2019/073431, mailed Nov. 14, 2019, 8 pages.

First Office Action for Chinese Patent Application No. 201980076832.2, dated Jun. 17, 2022, The State Intellectual Property Office of People's Republic of China, 20 pages.

* cited by examiner

REFRIGERATION CIRCUIT WITH PRESSURE EQUALIZATION BETWEEN MULTIPLE CONDENSERS

Modern air-conditioning systems, especially in vehicles such as motor vehicles or trucks, are required to cover ever wider operating ranges of cooling capacity. These can be covered less and less with a fixed structural dimensioning of the heat exchangers. Moreover, a fixed structural dimensioning of the heat exchangers can lead to disadvantages in energy efficiency or the controllability of the air-conditioning system.

Especially in vehicles with a purely electric powertrain, there are a plurality of requirements for cooling the various components and systems. In addition to the usual cooling of the vehicle cabin, there may be an additional cooling requirement for the battery, which supplies the powertrain with energy, or for the battery charging technology. This may require considerably higher cooling capacities at times. Such a battery can also be referred to as a powertrain accumulator, since it is typically designed as a secondary battery and is intended to supply the powertrain with energy.

Conventionally, the refrigerant circuit of such an air conditioning system of a purely electrically powered vehicle contains only one condenser, which is used permanently. The condenser is a heat exchanger in which the gaseous refrigerant compressed by an air conditioning compressor condenses while releasing heat. When dimensioning this condenser, it is on the one hand dimensioned sufficiently large so that the required cooling capacity can be provided for cooling the vehicle cabin and/or for cooling the waste heat generated by the battery while driving. However, a too large dimensioning of the condenser leads to an energetically inefficient operation of the refrigerant circuit, so that the battery has to provide more energy to operate the refrigerant circuit. Eventually, this would significantly reduce the maximum achievable range of the purely electrically powered vehicle.

The required, wide power range of the air conditioning compressor can be controlled by the rotational speed, the pressure ratios and/or the mass flow of the refrigerant flowing through the air conditioning compressor. In the case of heat exchangers, such as a condenser, the energetically efficient usable range can only be extended by an arrangement of several, preferably differently dimensioned, condensers, between which switching is possible by means of suitable valves.

Especially when charging the battery while driving, frequent switching between the different condensers may be necessary. For example, charging the battery while driving can be done by recuperation, i.e. by feeding back recovered braking energy. However, charging the battery while driving can also be made possible by inductive charging, for example. If a section of the route is traversed in which charging of the battery is possible, a powerful condenser is connected in addition to a low-dimensioned, permanently operated condenser in order to provide an appropriate cooling capacity for waste heat generated during charging. If this section is left, the high-performance heat exchanger is deactivated.

In particular, frequent switching between the heat exchangers can be expected when charging the powertrain accumulator during driving operation, as not every route section is equipped with charging technology throughout. When entering a sub-section with charging technology, the powerful heat exchanger is connected in addition and cools down the high waste heat generated during charging. When leaving the sub-section or route section with charging technology, the powerful heat exchanger is deactivated again.

Switching between two different condensers that do not have a permanent flow generates pressure pulses in the gas dynamics of the refrigerant. These pressure pulses can result in comfort-acoustically disturbing noises. Furthermore, the durability of the components of the refrigerant circuit and/or the air conditioning system can be considerably impaired. In addition, a disadvantageous displacement of the refrigerant into temporarily unused areas of the refrigerant circuit can occur, so that the refrigerant cannot be actively used in the cyclic process of the refrigerant circuit. This considerably reduces the energy efficiency of the refrigerant circuit.

It is thus apparent from the prior art that there is still no satisfactory technical solution for the disadvantages described above. It is therefore an object of the invention to provide a refrigerant circuit which, on the one hand, enables refrigerating capacities with operating ranges as wide as possible and, on the other hand, dampens and/or isolates pressure pulses in the gas dynamics of the refrigerant and/or even prevents them completely.

The object is solved in particular by a refrigerant circuit according to claim 1, a method for operating the refrigerant circuit according to claim 22 and a vehicle according to claim 25.

According to a first aspect of the invention, the object is solved in particular by a refrigerant circuit, in particular for use in a vehicle, preferably a motor vehicle, comprising: an air conditioning compressor, a main condenser, at least one connectable condenser (or, optionally, disconnectable), and a switching means which is designed to connect one or more of the connectable condensers to the refrigerant circuit, a pressure equalising means being designed to equalise (or approximate, respectively) an internal pressure of the at least one connectable condenser to an internal pressure of the main condenser.

In particular, the main condenser is operated permanently in an active manner and the connectable condenser or condensers are deactivated during normal operation of the refrigerant. The main condenser is dimensioned in such a way that it is adapted to a required cooling capacity during normal operation. As soon as more cooling capacity is required, the connectable condenser(s) can be connected by the switching means. However, the previously deactivated connectable condenser or condensers normally have a lower internal pressure than the active main condenser. In particular, connecting without equalising the internal pressure of the connectable condenser(s) can generate a pressure surge due to a abrupt inflow of refrigerant into the connectable condenser or condensers. Consequently, there is a connection between an internal pressure difference of the main condenser with respect to the connectable condenser(s). By keeping this internal pressure difference as small as possible before connecting or by completely equalising the internal pressures, a pressure pulse occurring during connection can be minimised. In particular, it can even be achieved by the equalisation that pressure pulses are completely avoided or at least (significantly) reduced. If the internal pressure in one of the deactivated condensers should rise too high by the pressure equalising means, occurence of a continuous pressure increase can be prevented by suitable non-return valves connected downstream of the condensers.

A refrigerant circuit is understood to mean in particular a refrigerating machine in which a refrigerant is moved in a circuitry. Preferably, the refrigerant undergoes various changes of the aggregate state in succession. The initially gaseous refrigerant is compressed in an air conditioning compressor. Downstream of the air conditioning compressor a condenser is connected in which the refrigerant condenses while releasing heat. Subsequently, the liquefied refrigerant is expanded due to a pressure change via a throttle, which is designed, for example, as an expansion valve or an expansion capillary. In a downstream evaporator, the refrigerant evaporates while absorbing heat, whereby thermal energy is extracted from the evaporator. The refrigerant circuit is now run through again, so that compression of the gaseous refrigerant takes place in the air conditioning compressor. Typical application goals of a refrigerant circuit may be the provision of cooling capacity and/or thermal capacity (heat pump operation). In special applications, for example in the case of electrically driven motor vehicles, the simultaneous demand of cooling capacity (for cooling the inverter and accumulator) and of heating capacity (for heating the vehicle cabin) can occur during fast charging of the powertrain accumulator in winter.

An evaporator and a condenser are generally understood to be a heat exchanger (a heat transfer device).

The respective heat exchanger can be configured as a gas cooler.

A plurality of heat exchangers (connected in parallel and/or in series) can form a heat exchanger unit.

A plurality of condensers (connected in parallel and/or in series) can form a condenser unit. A plurality of evaporators (connected in parallel and/or in series) can form an evaporator unit.

The refrigerant circuit may be configured so that air and/or water and/or refrigerant or cooling media can flow through.

By an equalisation or approximation, respectively, of the respective pressure, in particular internal pressure, it is to be understood in particular that a pressure difference is smaller by at least 50%, preferably at least 90%, compared to a (hypothetical case) in which the (respective) pressure equalising means is not provided or is inactive.

In particular, any common refrigerant can be used as a refrigerant, but also special refrigerants such as C02 (R744). Furthermore, the devices and methods according to the invention can be applied to single-phase and multi-phase fluids or fluid mixtures also outside of refrigeration technology, for example in hydraulics or pneumatics.

An air conditioning compressor can be understood in particular as a rotary piston compressor, scroll compressor, reciprocating compressor, screw compressor or turbo compressor, the compression capacity of which can be controlled or regulated, respectively, during operation via its rotational speed and/or via the position of a swash plate and/or via cylinder deactivation.

In particular, the main condenser is to be understood as a heat exchanger that is dimensioned such that it provides optimum cooling performance during normal operation. During normal operation, the main condenser is preferably permanently active. The dimensioning of a condenser refers to the spatial extent of the condenser. Here, a proportionality between cooling capacity and the size of an inner surface of the condenser applies at least essentially. A connectable condenser is a further, preferably differently dimensioned, condenser which can be connected to the refrigerant circuit by a switching means.

A switching means can be, for example, a switching valve that can control a fluid flow present at an inlet to a first outlet or to a second outlet. Furthermore, it is also possible to realise this functionality by using two individual valves. Furthermore, intermediate states are also possible in which the fluid flow present at the inlet can be divided proportionally between the outlets of the switching valve.

In particular, connecting can also be understood to be switching, so that after connecting the main condenser is deactivated and the connectable condenser or condensers are activated. It is also possible that only certain connectable condensers from a plurality of connectable condensers are connected, while other connectable condensers remain deactivated. It is also possible that one of the connectable condensers is permanently active during normal operation and the main condenser is connected.

Furthermore, the pressure equalising means is particularly suitable for heating the connectable condenser(s) and/or the main condenser, whereby an equalisation (approximation) of the internal pressures can be realised simply and economically.

In a preferred embodiment, the pressure equalising means comprises an electric heater, which in particular is configured so that it can be switched on and off and/or is controllable and/or regulatable. The electric heater is particularly suitable for being precisely controlled or regulated, whereby an adaption of the internal pressures can be achieved as quick and efficient as possible. Furthermore, an electric heater or one electric heater each can be easily integrated into the connectable condenser or condensers and/or the main condenser. Likewise, an electric heater can also be attached externally instead of being completely integrated into the condenser. Furthermore, several locally activatable heaters can be placed at any point of the refrigeration circuit on/in components or on/in lines.

Preferably, the pressure equalising means is suitable for heating one or more of the connectable condensers by inflow with a waste heat of the main condenser. This makes it possible to use the heat loss of the main condenser. The refrigerant circuit can thus be optimised in terms of energy efficiency. Alternatively, the pressure equalising medium is suitable for heating one or more of the connectable condensers by inflow with preheated fresh air.

In a preferred embodiment, the refrigerant circuit further comprises at least one evaporator, wherein at least one additional pressure changing means is arranged before, within and/or after the evaporator with respect to a flow direction of the refrigerant circuit, which is in particular designed to adapt an internal pressure of the evaporator(s).

In particular, pressure changing means can be understood to be pressure equalising means according to the above type. The pressure changing means can be heated by inflow with waste heat, for example from the main condenser, whereby a pressure change of the internal pressure is achieved. Furthermore, pressure changing means can comprise electrical heaters, which in particular are designed so that they can be switched on and off and/or they are controllable and/or regulatable.

This avoids or at least reduces disturbing noise developments (such as hissing noises) that can occur due to non-stationary phase transitions and/or swashing liquid refrigerants.

In addition, icing of the evaporator can be avoided so that a cooling capacity can be ramped up in a water chiller, a so-called chiller. This allows higher rotational speeds of the (electronic) refrigeration compressor (eKMV) and a larger mass flow proportion flowing through the chiller.

Furthermore, it is avoided in particular that refrigerant displacements can occur at different points of the refrigerant circuit, for example in the evaporator.

It is preferred that at least one further sub-section of the refrigerant circuit (such as, for example, a second refrigerant compressor or a second evaporator) can be temporarily separated from and connected to the refrigerant circuit, wherein in particular the at least one further sub-section is provided with at least one further pressure equalising means which is preferably designed to equalise (or approximate, respectively) an internal pressure of a plurality of sub-sections to one another and/or to the internal pressure of the main condenser and/or the connectable condenser. In this way, pressure gradients during connecting operations between sub-sections of the refrigerant circuit can be reduced or avoided as far as possible.

Further sub-sections can be understood, for example, according to the invention, to be a second refrigerant compressor which can be connected in parallel or in series with the first refrigerant compressor with corresponding switching means. Furthermore, by further sub-sections it can also be understood, for example, that a second evaporator which can be connected in parallel or in series to the first evaporator with corresponding switching means.

Preferably, the refrigerant circuit also has at least one throttle element, which is in particular controllable and/or regulatable, wherein the throttle element(s) is/are preferably arranged before, within and/or after the evaporator and/or the main condenser and/or the connectable condenser with respect to the flow direction of the refrigerant circuit. As a result of this, gas-dynamically-vibro-acoustically coupled phenomena (such as hissing, gurgle) and/or an icing of the evaporator(s) can be avoided. Furthermore, power increases for cooling and heating purposes can be achieved by increasing the pressure and temperature level at the chiller, evaporator, condenser and/or gas cooler, allowing a higher eKMV rotational speed and a larger mass flow proportion flowing through the chiller.

Furthermore, in particular a heat transfer device or phase separator is arranged before the air conditioning compressor with respect to the direction of flow of the refrigerant circuit, whereby it can be avoided that the compressor sucks in liquid, especially in the case of fluorine-based refrigerants.

In particular, the pressure equalising means may additionally have a pressure equalisation capillary or be only such a capillary, by which the main condenser can be fluidically connected to one or more of the connectable condensers and/or the connectable condensers can be fluidically connected to each other. The pressure equalisation capillary ensures an identical static internal pressure in the main condenser and in the connectable condenser or condensers at any time. The result of the resulting refrigerant mass flow is that an amount to small of refrigerant is avoided both in the main condenser and in the connectable condenser(s). To prevent a condensation of the refrigerant flowing through the pressure equalising capillary, the connectable condenser(s) is/are not cooled in normal operation. Preferably, this can be achieved by a heat supply and/or by blocking supply air, for example by multileaf dampers. Thus, an equalisation of the internal pressures can be realised in a particularly cost-effective manner.

Preferably, the pressure equalising capillary has a controllable shut-off valve and/or a non-return valve, which makes it possible to achieve a controlled equalisation of the internal pressures through the cost-effective pressure equalisation capillary.

In a particularly preferred embodiment, the switching means, in particular in combination with the pressure equalising means, is arranged such that the connectable condenser or condensers can be connected in series with the main condenser, the switching means, in particular in combination with the pressure equalising means, preferably being arranged upstream with respect to the main condenser and the connectable condenser or condensers. This allows the connectable condenser or condensers to be connected specifically. The main condenser is permanently active in this circuit variant.

Alternatively, the switching means, in particular in combination with the pressure equalising means, is arranged such that the connectable condenser or condensers can be connected in parallel with the main condenser, the switching means, in particular in combination with the pressure equalising means, preferably being arranged upstream with respect to the main condenser and the connectable condenser or condensers. A parallel connection of the main condenser and the connectable condenser(s) results in further possibilities in terms of circuitry. A parallel connection makes it possible, for example, to connect the connectable condenser or condensers while the main condenser can be relieved or deactivated, respectively. In addition, a finer breakdown of the switching states can be made. For example, a main condenser having small dimensions and a connectable condenser that has larger dimensions than the main condenser can be controlled into three switching states by means of a parallel connection. In a first switching state, the main condenser is active and the connectable condenser is deactivated. In a second switching state, the connectable condenser is active and the main condenser is deactivated. And finally, in a third switching state, the main condenser and the connectable condenser are active. The different dimensioning of the main condenser and the connectable condenser thus result in three different cooling line levels with which the refrigerant circuit can be operated.

In particular, the pressure equalising means is controlled and/or regulated by a control or regulating unit, wherein the main condenser and the connectable condenser or condensers each have pressure sensors which are designed to send measurement data of the pressure sensors to the control or regulating unit. In particular, the pressure sensors provide measurement data about the internal pressures of the main condenser and the connectable condenser(s). This measurement data is preferably sent to the control or regulating unit, which makes it possible to reliably control the internal pressure in the connectable condenser(s) to the internal pressure of the main condenser. For example, a proportional-integral controller (PI controller) or also a proportional-integral-derivative controller (PID controller) can function as the control or regulating unit. In this context, however, multiple control or regulating devices assigned to the individual main condenser or the at least one individual connectable condenser can also be understood as a control or regulating unit. Preferably, the individual control or regulating devices are connected to each other as well as to the respective pressure sensors via a bus communication system.

Alternatively, pressure sensors can also be mounted in supply lines of the main condenser and the connectable condenser or condensers, which are configured to send measurement data of the pressure sensors to the control or regulating unit. By mounting the pressure sensors in the respective supply lines, the main condenser and the connectable condenser(s) remain inexpensive and easy to manufacture, since the pressure sensors do not have to be integrated in the condensers.

In particular, the pressure equalising means may comprise means for varying a waste heat flow in a waste heat air flow of the main condenser and/or in the connectable condenser (s), wherein the means for varying the waste heat flow are in particular pivotable multileaf dampers. This embodiment is particularly cost-effective.

Preferably, the switching means can be designed as a switching valve, in particular a 3/2-way switching valve, which in particular enables a partially open switching state in addition to an open and a closed switching state. This makes it possible to realise an equalisation of the internal pressures before the main mass flow is activated directly through the switching means without the need for a separate capillary.

Furthermore, the switching means can be designed as a multiport switching valve. This means that as an m/n-way switching valve it switches m inlets to n outlets.

It is preferred that the switching valve has a pressure equalisation capillary with which a fluid connection can be established between a first outlet line and a second outlet line of the switching valve. In particular, the pressure equalisation capillary can be at least partially integrated within the switching valve.

This can achieve a balance of pressure gradients between the outlet lines of the switching valve with the aid of a pilot fluid flow that is running ahead, thus avoiding pressure pulses.

In particular, the pressure equalising capillary comprises a valve adapted to open and close the pressure equalising capillary, thereby the pilot fluid stream running ahead can be adjusted. Preferably, the pressure equalising capillary is permanently open.

It is preferred that the switching valve has capillary bores in a stator and/or a rotor of the switching valve, whereby a fixed timing sequence can be achieved in which a pilot fluid stream precedes a main fluid stream in time for each switching operation.

The above object is solved in particular by a method for operating a refrigerant circuit, whereby the main condenser is operated in a permanently active manner and before and/or during a connection of one or more of the connectable condensers, the internal pressure of the connectable condenser(s) is adapted to the internal pressure of the main condenser (or is approximated to it).

It is preferred that when one or more of the connectable condensers are connected, at first a pilot fluid flow passes through the pressure equalising capillary and/or the capillary bores of the switching valve to equalise the internal pressure of the connectable condenser(s) to the internal pressure of the main condenser. This allows the internal pressure of the connectable condenser(s) and/or of lines connected to the connectable condenser(s) to be equalised before a main fluid flow is switched.

Optionally, the capillary can be connected outside the 3/2-way valve. In this way, the capillary can also be coupled at a position in the refrigerant circuit that carries liquid refrigerant. This can be done, for example, on the liquid line downstream of the condenser.

In particular, a rotational speed and/or a mass flow of the air conditioning compressor can be determined before and/or during connection, whereby the air conditioning compressor, if the rotational speed and/or the mass flow is a very small value, which is preferably equal to zero, is controlled in such a way that the rotational speed and/or the mass flow is regulated to this very small value, which is preferably equal to zero. Such a control can prevent the air conditioning compressor from being moved or rotated by a pressure drop between an internal pressure of the air conditioning compressor and the internal pressure of the main condenser and/or the connectable condenser(s) or by a fluid flow resulting from the pressure drop. In particular, a very small value of the rotational speed can be understood as a value that is smaller than 0.5 rpm, preferably smaller than 0.1 rpm or particularly preferably smaller than 0.01 rpm. By a very small value of the mass flow can be understood a value that is smaller than 2.5 g/s, preferably smaller than 1 g/s, or in particular smaller than 0.01 g/s.

The above object is further solved in particular by a vehicle, in particular a motor vehicle, comprising a refrigerant circuit of the above type, which is operated in particular by a method of the above type. Preferably, the vehicle is an electric vehicle or a hybrid vehicle, wherein the vehicle comprises a powertrain accumulator. In particular, when charging the powertrain accumulator during a driving operation of the vehicle, frequent switching between the condensers of the refrigerant circuit is to be expected, since not every driving route is continuously equipped with charging technology. When entering a sub-section with charging technology, the powerful condenser is connected and cools away a high waste heat generated during charging. When leaving the sub-section with charging technology, the powerful condenser is deactivated again. In this scenario, the application of the present invention is particularly advantageous.

Further embodiments result from the dependent claims.

Figure 2:
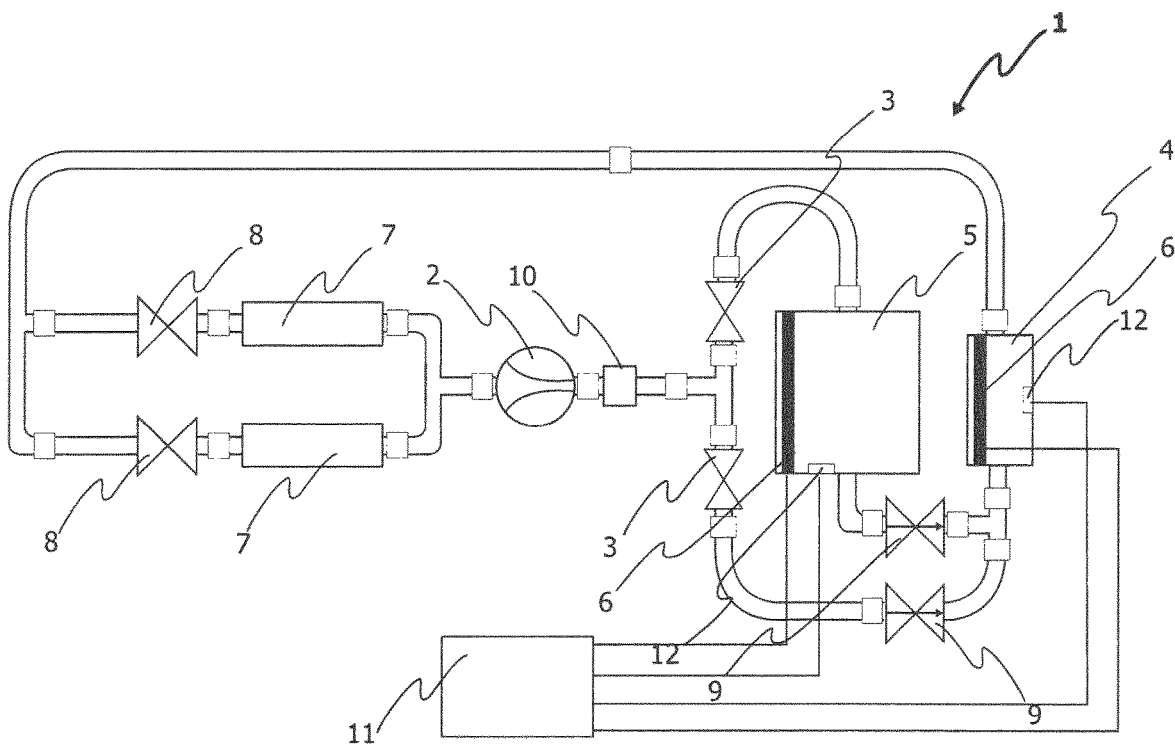
Figure 3:
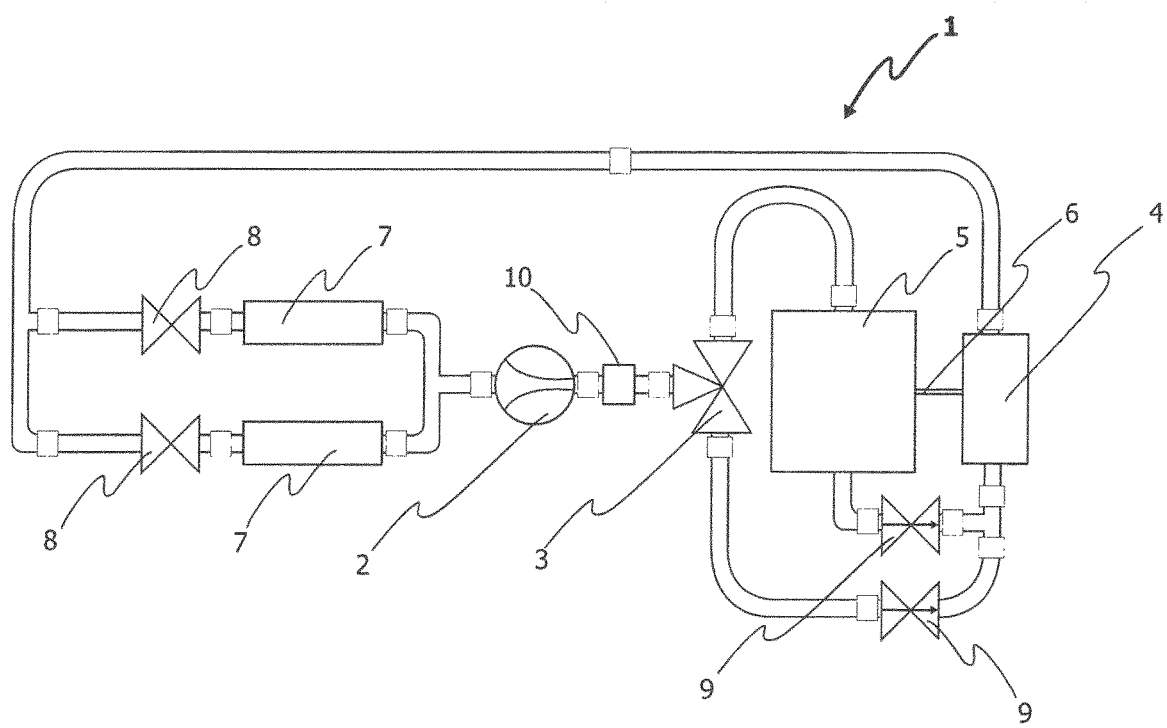
Figure 4:
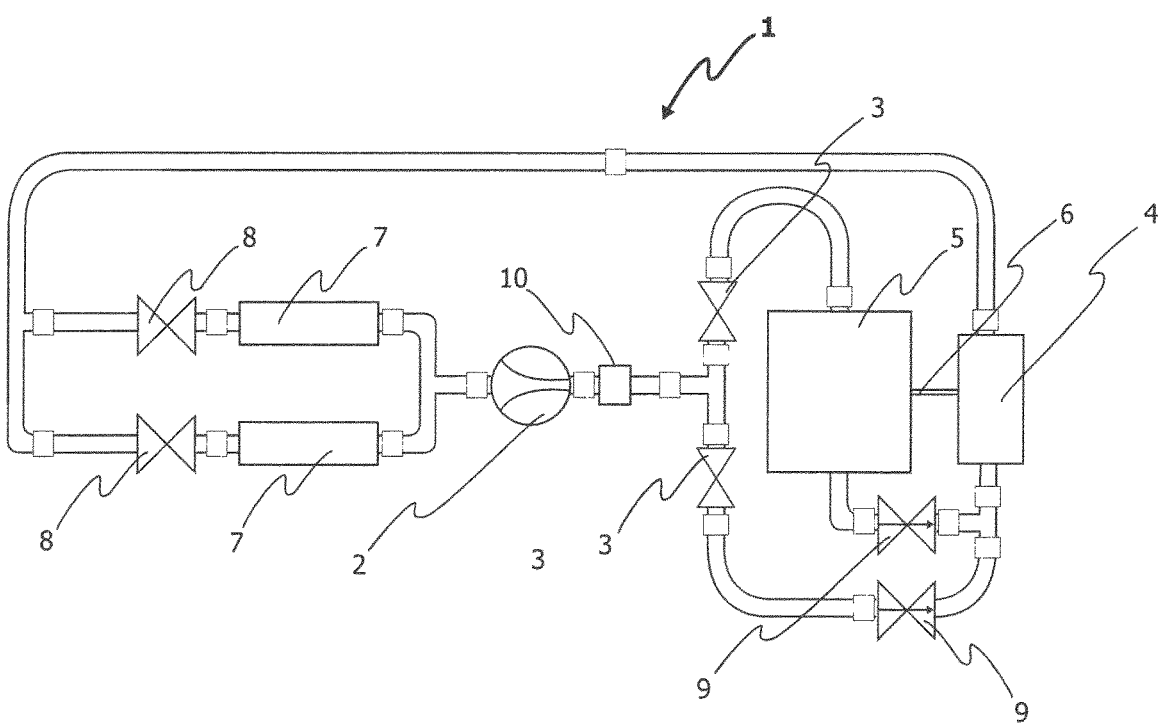
Figure 5:
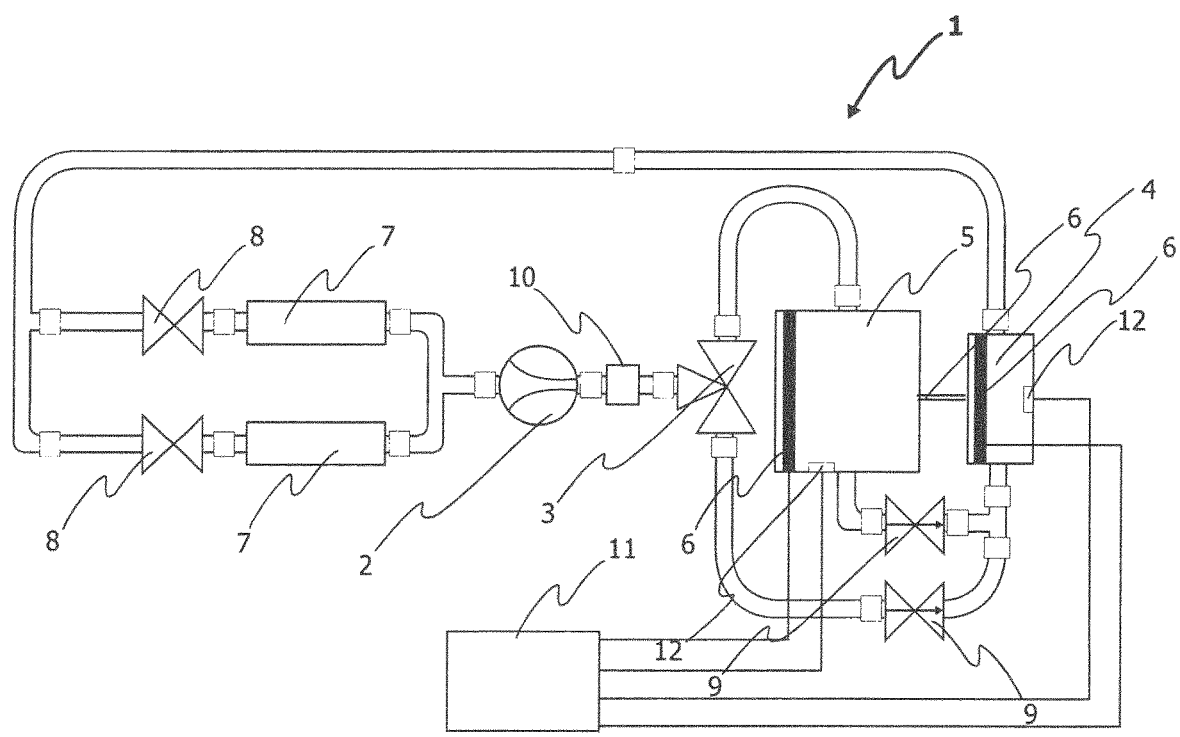
Figure 6:
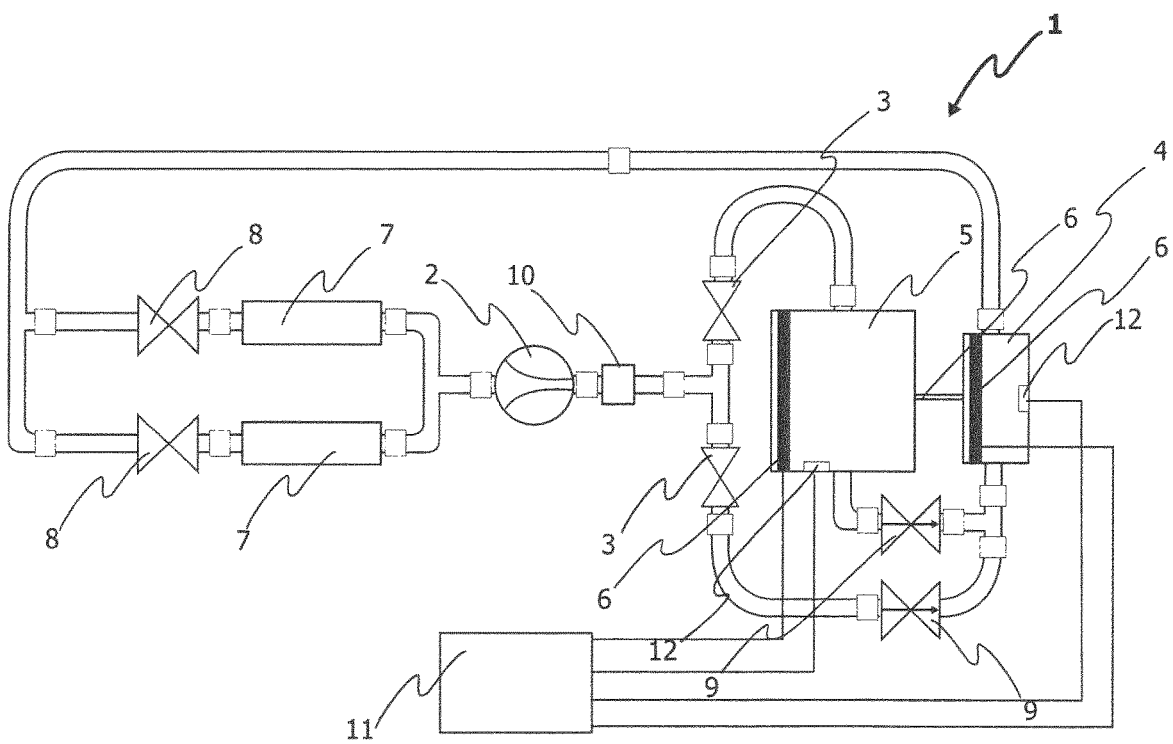
Figure 7:
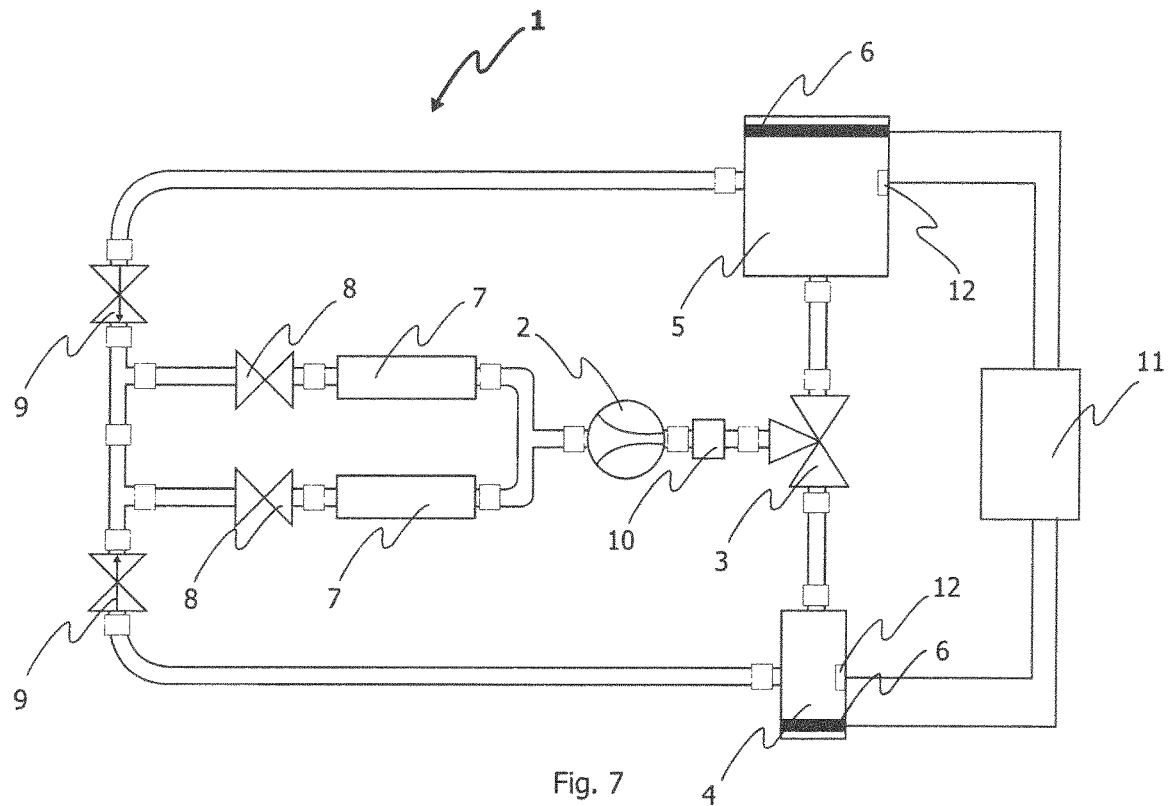
Figure 8:
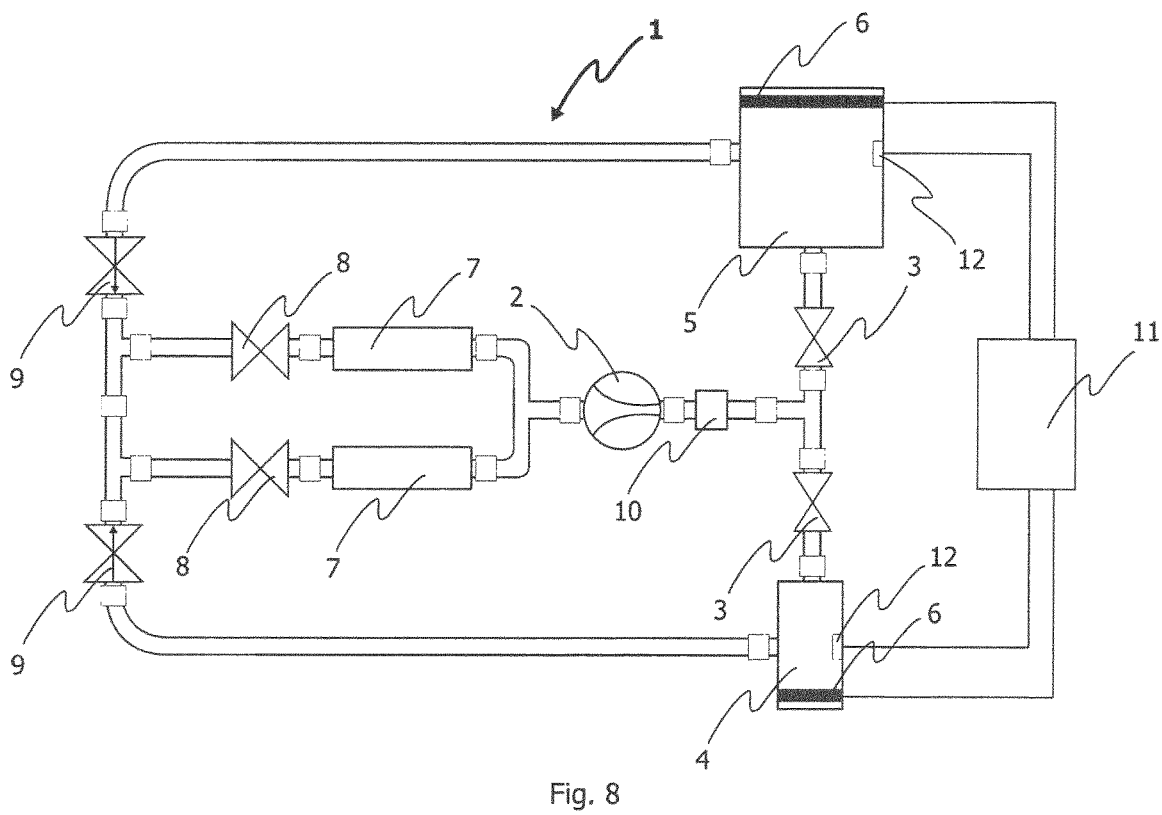
Figure 9:
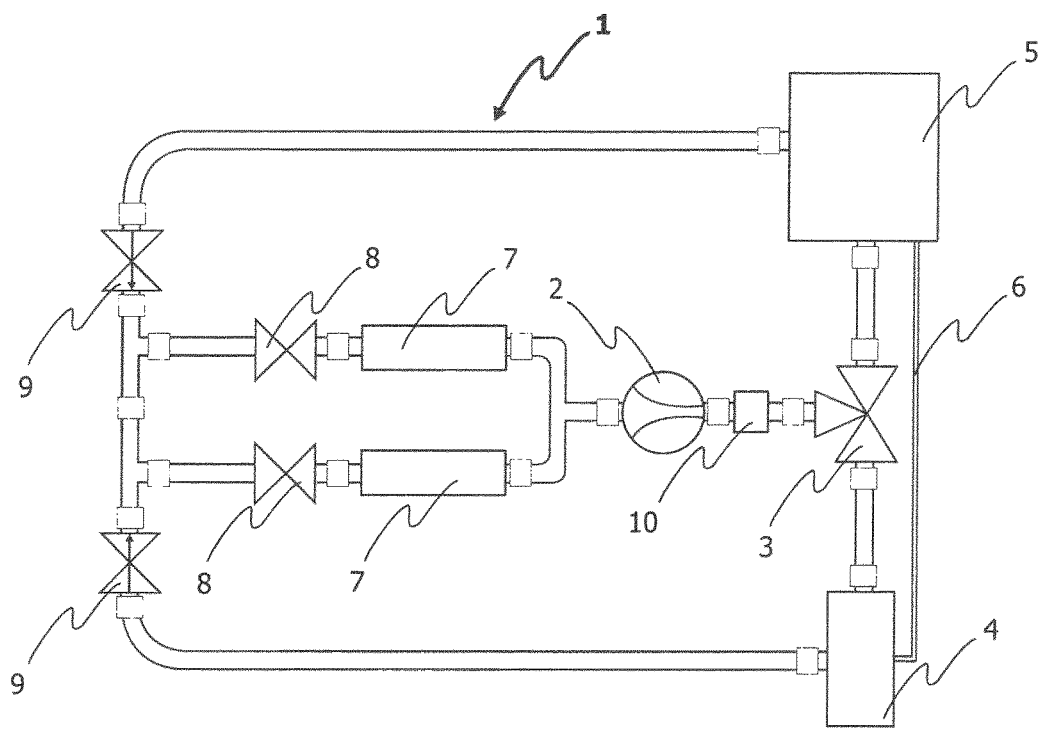
Figure 10:
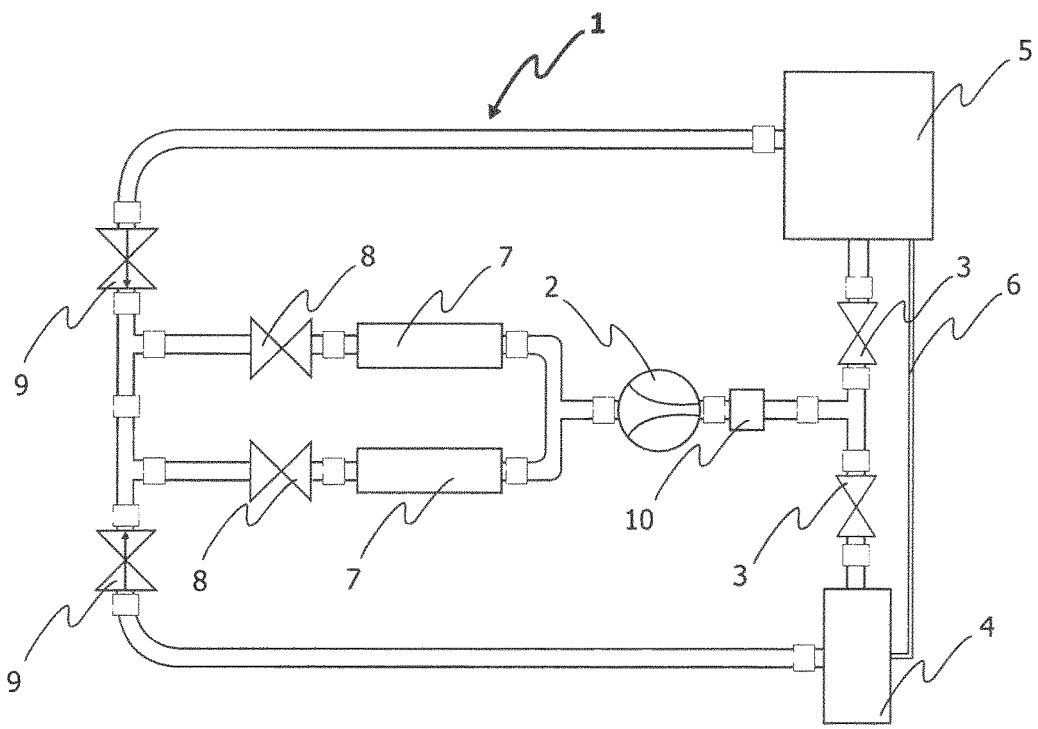
Figure 11:
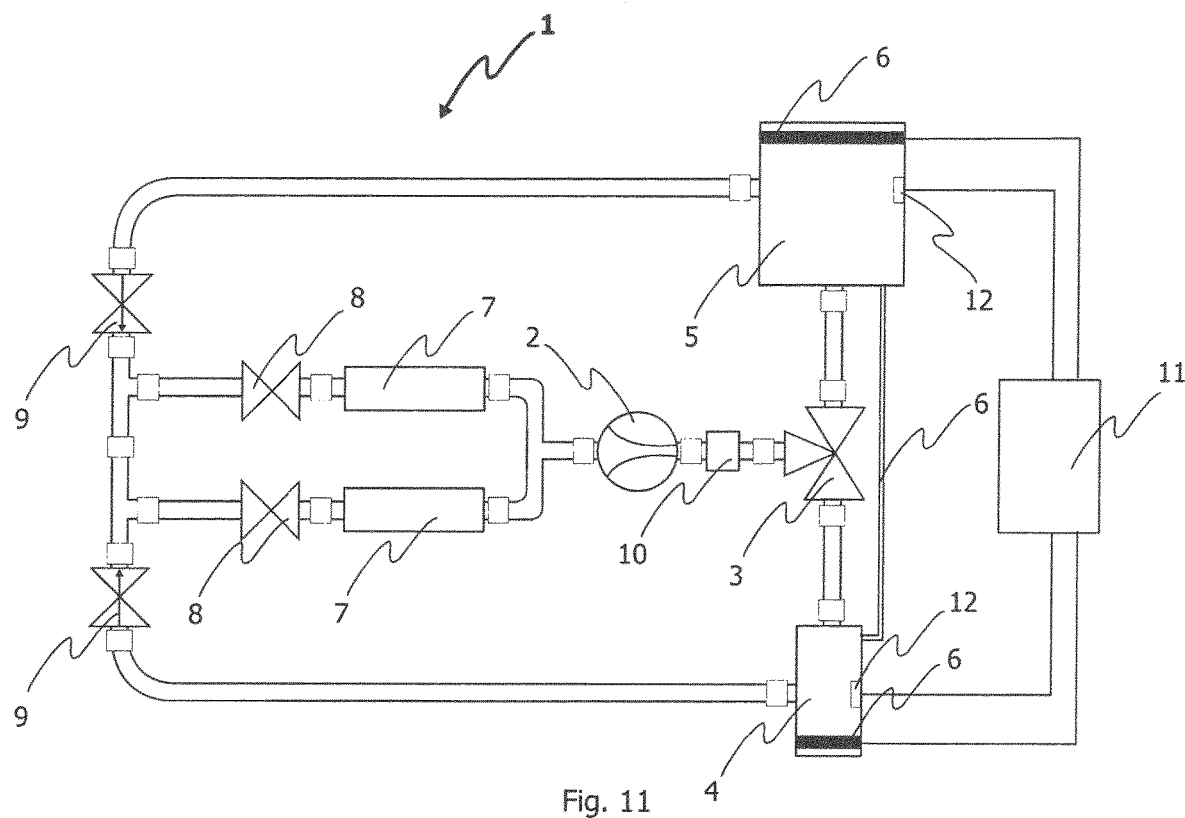
Figure 12:
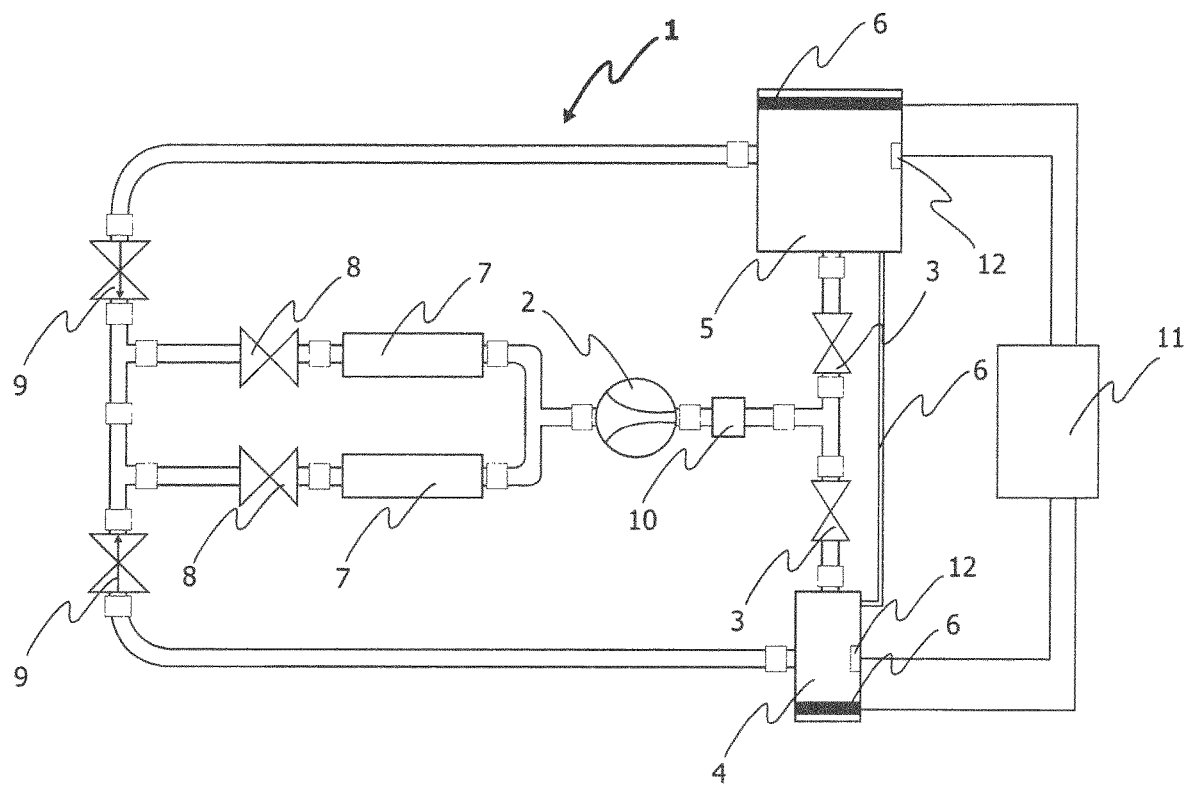
Figure 13C:
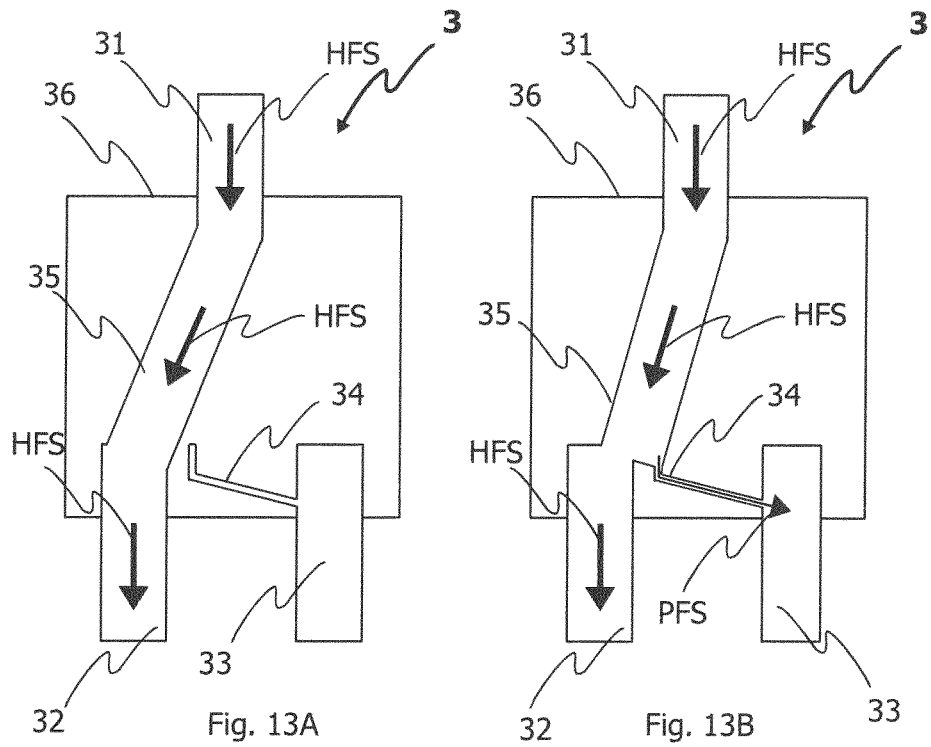
Figure 13C:
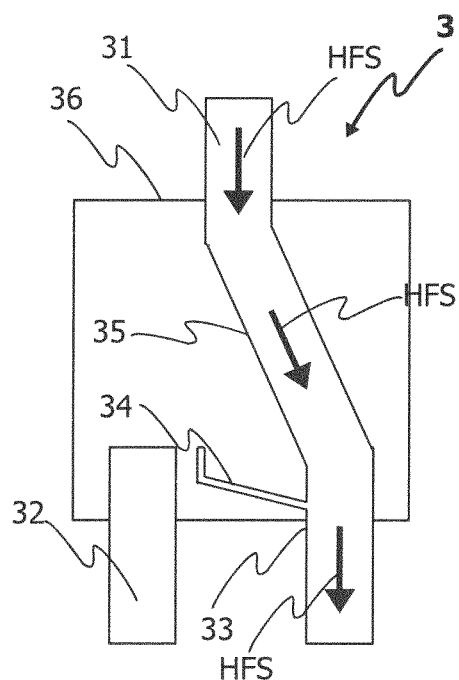
Figures 14A, 14B:
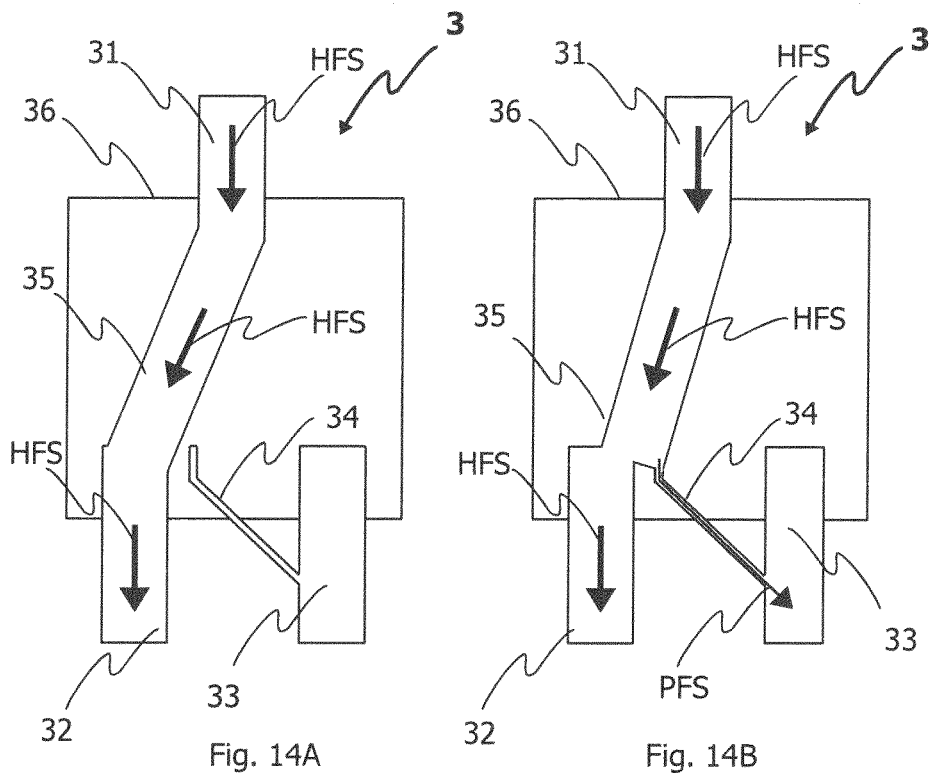
Figure 14C:
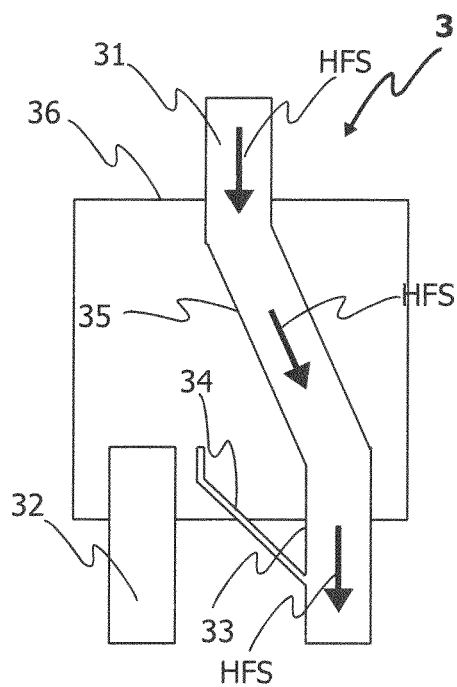

The invention is described below with reference to exemplary embodiments, which are explained in more detail with reference to the drawings which show:

FIG. 1 a circuit diagram of a first embodiment of the refrigerant circuit according to the invention;

FIG. 2 a circuit diagram of a second embodiment of the refrigerant circuit according to the invention;

FIG. 3 a circuit diagram of a further embodiment of the refrigerant circuit according to the invention;

FIG. 4 a circuit diagram of a further embodiment of the refrigerant circuit according to the invention;

FIG. 5 a circuit diagram of a further embodiment of the refrigerant circuit according to the invention;

FIG. 6 a circuit diagram of a further embodiment of the refrigerant circuit according to the invention;

FIG. 7 a circuit diagram of a further embodiment of the refrigerant circuit according to the invention;

FIG. 8 a circuit diagram of a further embodiment of the refrigerant circuit according to the invention;

FIG. 9 a circuit diagram of a further embodiment of the refrigerant circuit according to the invention;

FIG. 10 a circuit diagram of a further embodiment of the refrigerant circuit according to the invention;

FIG. 11 a circuit diagram of a further embodiment of the refrigerant circuit according to the invention;

FIG. 12 a circuit diagram of a further embodiment of the refrigerant circuit according to the invention;

FIG. 13A a schematic detailed view of an exemplary embodiment of a 3/2-way switching valve in a first switching state;

FIG. 13B a schematic detailed view of an exemplary embodiment of a 3/2-way switching valve in a second switching state;

FIG. 13C a schematic detailed view of an exemplary embodiment of a 3/2-way switching valve in a third switching state;

FIG. 14A a schematic detailed view of an exemplary embodiment of a 3/2-way switching valve in a first switching state;

FIG. 14B a schematic detailed view of an exemplary embodiment of a 3/2-way switching valve in a second switching state; and FIG. 14C a schematic detailed view of an exemplary embodiment of a 3/2-way switching valve in a third switching state;

FIG. 1 shows a circuit diagram of a first embodiment of the refrigerant circuit according to the invention. The illustrated refrigerant circuit 1 comprises the following components: an air conditioning compressor 2, a downstream precooler 10, a downstream switching valve 3, a main condenser 4 as well as a connectable condenser 5, which is arranged to be connectable in series, as well as two expansion valves 8 connected in parallel, each with a downstream evaporator 7. A non-return valve 9 is arranged between the switching means 3 and the main condenser 4, and a further non-return valve is arranged between the main condenser 4 and the connectable condenser 5. The individual components are connected by refrigerant lines.

Furthermore, the main condenser 4 and the connectable condenser 5 each comprise a pressure sensor 12. The connectable condenser 5 comprises a pressure equalising means 6, which in the illustrated embodiment is designed as a controllable or adjustable electric heater. In the illustrated embodiment, the main condenser 4 also comprises a pressure equalising means 6, which is also designed as a controllable or adjustable electric heater 6. Furthermore, FIG. 1 shows a control or regulating unit 11 which is suitable for receiving measurement data from the pressure sensors 12 and for controlling or regulating, respectively, the controllable or regulatable electric heaters in the connectable condenser 5 and/or in the main condenser 4 on the basis of the measurement data received.

The rectangles shown in FIG. 1 between the illustrated components of the refrigerant circuit 1 indicate positions in the refrigerant circuit 1 where further modifications can be made to the refrigerant circuit 1. These further modifications make it possible to further reduce the amplitudes of any gas pressure pulses that may occur or their vibro-acoustic effects.

For example, one of these modifications may consist of a muffler, which comprises a component that first has a widening double cross-sectional leap followed by a narrowing double cross-sectional leap. Furthermore, the modifications may include Helmholtz resonators or fluid silencers in the form of compressible bodies within the refrigerant line. In addition, fluid silencers in the form of a secondary volume coupled to the line (compressor protection) are also conceivable. Also possible are tube portions with mechanically resilient elastomer components or also adjustable bypass lines between the inlet and outlet of the switching valve. Furthermore, actively counter-sound generating components can be used, which can cancel the pressure pulse by means of destructive interference. Material accumulations in walls of the refrigerant lines and/or in fluid-carrying components can also be made as further modifications. Barrier masses on the refrigerant lines and/or on fluid-carrying components are also conceivable.

FIG. 2 shows a circuit diagram of a further embodiment of the refrigerant circuit 1 according to the invention. In addition to the embodiment shown in FIG. 1, the switching valve 3 is here implemented by two individual switching valves 3.

FIG. 3 shows a further embodiment of the refrigerant circuit 1 according to the invention. This is a series connection between the main condenser 4 and the connectable condenser 5, similar to that shown in FIG. 1, but here a pressure equalising capillary 6 serves as the pressure equalising means 6. In this embodiment, the switching means 3 is designed as a single switching valve 3 with one inlet and two outlets between which switching is possible.

FIG. 4 shows a further embodiment of the refrigerant circuit 1 according to the invention. The illustrated refrigerant circuit 1 also comprises a series connection between the main condenser 4 and the connectable condenser 5, similar to that shown in FIG. 1. However, in this embodiment, a pressure equalising capillary 6 serves as the pressure equalising means 6 instead of an electric heater 6 as in the embodiment illustrated in FIG. 1. In addition to the embodiment shown in FIG. 3, here the switching valve 3 is implemented by two individual switching valves 3.

FIG. 5 shows a further embodiment of the refrigerant circuit 1 according to the invention. The illustrated refrigerant circuit 1 also comprises a series connection between the main condenser 4 and the connectable condenser 5, similar to that shown in FIG. 1. In this embodiment, in addition to the controllable or adjustable electric heater, a pressure equalising capillary 6 serves as the pressure equalising means 6. In this embodiment, the switching means 3 is designed as a single switching valve 3 with one inlet and two outlets between which switching can be performed.

The embodiment of the refrigerant circuit 1 according to the invention illustrated in FIG. 6 also shows, like the previously illustrated embodiment, a series connection between the main condenser 4 and a connectable condenser 5. Also in this embodiment electric heaters 6 are used together with a pressure equalisation capillary 6 as pressure equalising means 6. Only the switching means 3 is, unlike in the previous embodiment, implemented in this embodiment by two separate switching valves 3.

FIG. 7 shows a circuit diagram of a further embodiment of the refrigerant circuit 1 according to the invention. The refrigerant circuit 1 shown in FIG. 7 forms a parallel arrangement of the main condenser 4 and the connectable condenser 5.

The parallel arrangement of the main condenser 4 and the connectable condenser 5 requires that a non-return valve 9 is arranged downstream of each of the main condenser 4 and the connectable condenser 5, since otherwise refrigerant that has already passed the active condenser (such as the main condenser 4) will flow into or be forced into the deactivated condenser (such as the connectable condenser 5, for example). This would withdraw the refrigerant from the active refrigerant circuit, so that the cooling capacity of the refrigerant circuit would decrease. This can be prevented by the appropriate arrangement of the non-return valves 9.

In particular, in the illustrated embodiment, the parallel arrangement of the main condenser 4 and the connectable condenser 5 enables switching between the main condenser 4 and the connectable condenser 5. This allows, for example, the connectable condenser 5 to be active first and the main condenser to be deactivated. Switching can now take place in such a way that the main condenser 4 is actively operated and the connectable condenser 5 is deactivated. Furthermore, it would also be possible to operate both the main condenser 4 and the connectable condenser 5 actively.

FIG. 8 shows a further embodiment of the refrigerant circuit 1 according to the invention. Like the refrigerant circuit illustrated in FIG. 7, the refrigerant circuit 1 illustrated here is also a parallel arrangement between the main condenser 4 and the connectable condenser 5. The difference between the embodiment illustrated in FIG. 7 is that the switching means 3 is implemented by two switching valves 3.

FIG. 9 illustrates a further embodiment of the refrigerant circuit 1 according to the invention. The illustrated embodiment, as previously shown in FIGS. 7 and 8, continues to be a parallel circuit between the main condenser 4 and the connectable condenser 5. In contrast to the previously illustrated embodiment, here the internal pressure of both condensers is equalised by a pressure equalising capillary 6. An electrical heater 6 is not provided in this embodiment.

The embodiment shown in FIG. 10 is also a parallel connection of the condensers. Also here a pressure equalising capillary 6 serves as the pressure equalising means 6. In FIG. 10, the switching means 3 is implemented by two separate switching valves 3.

FIG. 11 shows a further embodiment of the refrigerant circuit 1 according to the invention, in which there is a parallel circuit between the main condenser 4 and the connectable condenser 5. In this embodiment, both electric heaters 6 and pressure equalising capillaries 6 serve as pressure equalising means 6. The switching means shown is designed as a switching valve 3 with one inlet and two outlets.

Finally, FIG. 12 shows a refrigerant circuit 1 according to the invention, which essentially corresponds to the refrigerant circuit 1 shown in FIG. 11. In this embodiment, however, the switching means 3 is implemented by two separate switching valves 3.

FIG. 13A shows a schematic detailed view of an exemplary embodiment of a 3/2-way switching valve 3 in a first switching state. The 3/2-way switching valve 3 has an inlet line 31, a first outlet line 32 and a second outlet line 33. Furthermore, the 3/2-way switching valve 3 has a switching valve capillary 34, which in this exemplary embodiment is completely accommodated and/or integrated in a switching valve housing 36.

Furthermore, the 3/2-way switching valve 3 comprises a switching valve rotor 35 that can be moved such that a main fluid flow HFS can flow through the inlet line 31 via the switching valve rotor 35 into the first outlet line 32. In FIG. 13A, the main fluid flow HFS flows through the inlet line 31 via the switching valve rotor 35 into the first outlet line 32. The illustrated state is referred to as the first switching state.

FIG. 13B shows the exemplary embodiment of the 3/2-way switching valve 3 illustrated in FIG. 13A in a second switching state. Here, the switching valve rotor 35 is in a position in which the main fluid flow HFS continues to flow through the inlet line 31 via the switching valve rotor 35 into the first outlet line 32. In the second switching state, however, the switching valve rotor 35 is in a position in which the switching valve capillary 34 opens to the main fluid flow HFS, so that a pilot fluid flow PFS can flow through the switching valve capillary 34. In this way, before the main fluid flow HFS is switched, a pressure balance takes place by the pilot fluid flow via the switching valve capillary 34.

In FIG. 13C, the exemplary embodiment of the 3/2-way switching valve 3 illustrated in FIGS. 13A and 13B is shown in a third switching state. In this state, the main fluid flow HFS flows through the inlet line 31 via the switching valve rotor 35 into the second outlet line 33. The third switching state thus describes the switching state after a switching of the main fluid flow HFS.

FIG. 14A shows a schematic detailed view of a further exemplary embodiment of a 3/2-way switching valve 3 in a first switching state. The 3/2-way switching valve 3 has an inlet line 31, a first outlet line 32 and a second outlet line 33.

A significant difference from the exemplary embodiment shown in FIGS. 13A to 13C is that the switching valve capillary 34 is not fully housed in the switching valve housing 36, but only partially housed in the switching valve housing 36.

In FIG. 14A, the main fluid flow HFS flows through the inlet line 31 via the switching valve rotor 35 into the first outlet line 32. The state shown is referred to as the first switching state.

FIG. 14B shows the exemplary embodiment of the 3/2-way switching valve 3 illustrated in FIG. 14A in a second switching state. Here, the switching valve rotor 35 is in a position in which the main fluid flow HFS continues to flow through the inlet line 31 via the switching valve rotor 35 into the first outlet line 32. In the second switching state, however, the switching valve rotor 35 is in a position in which the switching valve capillary 34 leads to the main fluid flow HFS, so that a pilot fluid flow PFS can flow through the switching valve capillary 34. In this way, before the main fluid flow HFS is switched, a pressure equalisation takes place by the pilot fluid flow via the switching valve capillary 34.

In FIG. 14C, the exemplary embodiment of the 3/2-way switching valve 3 illustrated in FIGS. 14A and 14B is shown in a third switching state. In this state, the main fluid flow HFS flows through the inlet line 31 via the switching valve rotor 35 into the second outlet line 33. The third switching state thus describes the switching state after a switching of the main fluid flow HFS.

At this point, it should be noted that all the parts described above, taken alone and in any combination, in particular the details shown in the drawings, are claimed to be substantial to the invention. Modifications thereof are familiar to the skilled person.

LIST OF REFERENCE SIGNS 1 refrigerant circuit
2 air conditioning compressor
3 switching means (switching valve)
4 main condenser (main heat exchanger)
5 connectable condenser (connectable heat exchanger)
6 pressure equalising means (pressure equalising capillary)
7 evaporator
8 expansion valve (expansion capillary)
9 non-return valve
10 pre-cooler
11 control or regulating unit
12 pressure sensor
13 damping and/or insulating element and/or bypass line connection
31 inlet line of the switching valve
32 first outlet line of the switching valve
33 second outlet line of the switching valve
34 switching valve capillary (switching valve capillary bore)
35 switching valve rotor
36 switching valve housing
HFS main fluid flow
PFS pilot fluid flow

The invention claimed is:

1. A refrigerant circuit configured to be used in a motor vehicle, the refrigerant circuit comprising:
an air conditioning compressor;
a main condenser;
at least one connectable condenser;
a switching device comprising a switching valve that is configured to connect to the at least one connectable condenser; and
a pressure equalising device comprising an electric heater and/or a capillary configured to equalise an internal pressure of the at least one connectable condenser with an internal pressure of the main condenser.

2. The refrigerant circuit according to claim 1, wherein the pressure equalising device is configured to heat the at least one connectable condenser and/or the main condenser.

3. The refrigerant circuit according to claim 2, wherein the pressure equalising device comprises the electric heater, wherein the electric heater is connectable, adjustable, or both.

4. The refrigerant circuit according to claim 2, wherein the pressure equalising device is configured to heat the at least one connectable condenser by inflow with a waste heat of the main condenser.

5. The refrigerant circuit according to claim 2, wherein the pressure equalising device is configured to heat the at least one connectable condenser by inflow with preheated fresh air.

6. The refrigerant circuit according to claim 1, further comprising:
at least one evaporator; and
an additional pressure equalising device comprising expansion valves configured to adapt an internal pressure of the at least one evaporator,
wherein the additional pressure equalising device is arranged before, within, and/or after the at least one evaporator with respect to a flow direction of the refrigerant circuit.

7. The refrigerant circuit according to claim 1, wherein:
the refrigerant circuit has a sub-section configured to be temporarily separated from the rest of the refrigerant circuit, and
the sub-section is provided with another pressure equalising device comprising an electrical heater and/or a capillary configured to equalise an internal pressure of the sub-section with other sub-sections and/or with the internal pressure of the main condenser and/or with the connectable condenser during a connection operation involving the sub-section.

8. The refrigerant circuit according to claim 1, further comprising:
at least one controllable and/or adjustable throttle member,
wherein the at least one throttle member is arranged before, within, and/or after the evaporator and/or the main condenser and/or the at least one connectable condenser with respect to a flow direction of the refrigerant circuit.

9. The refrigerant circuit according to claim 1, further comprising:
a heat transfer device comprising a heat exchanger or a phase separator arranged before the air conditioning compressor with respect to a flow direction of the refrigerant circuit.

10. The refrigerant circuit according to claim 1, wherein the the capillary comprises a pressure equalising capillary configured to fluidically connect the main condenser to the at least one connectable condenser and/or configured to fluidically connect the connectable condensers to one another.

11. The refrigerant circuit according to claim 10, wherein the pressure equalising capillary has a controllable shut-off valve and/or a non-return valve.

12. The refrigerant circuit according to claim 1, wherein:
the switching device in combination with the pressure equalising device connect the at least one connectable condenser in series with the main condenser, and
the switching device in combination with the pressure equalising device are arranged upstream with respect to the main condenser and the at least one connectable condenser.

13. The refrigerant circuit according to claim 1, wherein:
the switching device in combination with the pressure equalising device connect the at least one connectable condenser in parallel with the main condenser, and
the switching device in combination with the pressure equalising device are arranged upstream with respect to the main condenser and the at least one connectable condenser.

14. The refrigerant circuit according to claim 1, wherein the pressure equalising device is configured to be controlled and/or adjusted by a control or regulating unit.

15. The refrigerant circuit according to claim 14, wherein the main condenser and the at least one connectable condenser each comprise pressure sensors configured to send measurement data to the control or regulating unit.

16. The refrigerant circuit according to claim 14, further comprising:
pressure sensors mounted in supply lines of the main condenser and of the at least one connectable condenser, wherein the pressure sensors are configured to send measurement data to the control or regulating unit.

17. The refrigerant circuit according to claim 1, wherein the pressure equalising device comprises pivotable multileaf dampers that vary a waste heat flow in a waste heat air flow of the main condenser and/or in the at least one connectable condenser.

18. The refrigerant circuit according to claim 1, wherein the switching device is a 3/2-way switching valve that enables a partially closed switching state in addition to an open and a closed switching state.

19. The refrigerant circuit according to claim 18, wherein the 3/2-way switching valve has a pressure equalising capillary configured to establish a fluid connection between a first outlet line and a second outlet line of the 3/2-way switching valve.

20. The refrigerant circuit according to claim 19, wherein the pressure equalising capillary comprises a valve adapted to open and close the pressure equalising capillary.

21. The refrigerant circuit according to claim 19, wherein the pressure equalising capillary is permanently open.

22. The refrigerant circuit according to claim 18, wherein the 3/2-way switching valve comprises capillary bores in a stator and/or a rotor of the switching valve.

23. A method for operating a refrigerant circuit comprising an air conditioning compressor, a main condenser, and a switching valve, the method comprising:
operating the main condenser in a permanently active manner; and
before and/or during a connection of at least one connectable condenser to the switching valve, equalizing, using a pressure equalising device comprising a pressure equalising capillary and/or capillary bores, an internal pressure of the at least one connectable condenser to an internal pressure of the main condenser.

24. The method according to claim 23, wherein when the at least one connectable condenser is connected to the switching valve, a pilot fluid flow (PFS) flows through the pressure equalising capillary and/or the capillary bores of the switching valve to equalise the internal pressure of the at least one connectable condenser to the internal pressure of the main condenser.

25. The method according to claim 23, further comprising:
- determining, before and/or during the connection, a rotational speed and/or a mass flow of the air conditioning compressor,
- wherein the air conditioning compressor, if the rotational speed and/or the mass flow is a small value, is driven such that the rotational speed and/or the mass flow is regulated to this small value.

26. A motor vehicle, comprising:
- an air conditioning compressor;
- a main condenser;
- at least one connectable condenser;
- a switching device comprising a switching valve that is configured to connect to the at least one connectable condenser; and
- a pressure equalising device comprising an electric heater and/or a capillary configured to equalise an internal pressure of the at least one connectable condenser with an internal pressure of the main condenser.

* * * * *

UNITED STATES PATENT AND TRADEMARK OFFICE
CERTIFICATE OF CORRECTION

| | | |
|---|---|---|
| PATENT NO. | : 12,109,870 B2 | Page 1 of 1 |
| APPLICATION NO. | : 17/286061 | |
| DATED | : October 8, 2024 | |
| INVENTOR(S) | : Zimmermann et al. | |

It is certified that error appears in the above-identified patent and that said Letters Patent is hereby corrected as shown below:

On the Title Page

Column 1, Item (72), in "Inventors", Line 3, delete "Karsruhe," and insert -- Karlsruhe, --, therefor.

Column 1, Item (72), in "Inventors", Line 4, delete "Steinmauem," and insert -- Steinmauern, --, therefor.

In the Claims

In Column 13, Claim 10, Line 56, delete "the the" and insert -- the --, therefor.

Signed and Sealed this
Seventeenth Day of June, 2025

Coke Morgan Stewart
*Acting Director of the United States Patent and Trademark Office*